(12) United States Patent
Mettenbrink

(10) Patent No.: US 7,775,610 B2
(45) Date of Patent: Aug. 17, 2010

(54) FLOTATION DRIVE WHEEL FOR A SELF-PROPELLED IRRIGATION SYSTEM

(76) Inventor: Lynn W. Mettenbrink, 4438 North Rd., Grand Island, NE (US) 68803

( * ) Notice: Subject to any disclaimer, the term of this patent is extended or adjusted under 35 U.S.C. 154(b) by 170 days.

(21) Appl. No.: 12/070,830

(22) Filed: Feb. 21, 2008

(65) Prior Publication Data

US 2008/0217989 A1 Sep. 11, 2008

Related U.S. Application Data

(60) Provisional application No. 60/905,645, filed on Mar. 8, 2007.

(51) Int. Cl.
 *B60B 15/18* (2006.01)
(52) U.S. Cl. ............... 305/4; 301/44.3; 301/45
(58) Field of Classification Search ............... 301/41.1, 301/43, 44.3, 44.4, 45, 46, 47; 305/1, 3, 305/4, 5
See application file for complete search history.

(56) References Cited

U.S. PATENT DOCUMENTS

| 788,504 | A | * | 4/1905 | Green | 305/5 |
|---|---|---|---|---|---|
| 1,038,103 | A | * | 9/1912 | Erbes | 305/4 |
| 1,310,746 | A | * | 7/1919 | Firestone | 305/4 |
| 1,439,847 | A | * | 12/1922 | Slauson | 305/4 |
| 1,565,757 | A | * | 12/1925 | Slauson | 305/4 |
| 1,586,931 | A | * | 6/1926 | Wine | 305/4 |
| 1,586,933 | A | * | 6/1926 | Wine | 305/4 |
| 1,634,683 | A | * | 7/1927 | Probst | 305/4 |
| 1,666,036 | A | * | 4/1928 | Wine | 305/4 |
| 1,840,779 | A | | 1/1932 | Johnston | |
| 1,901,544 | A | * | 3/1933 | Welsford | 305/4 |
| 2,332,037 | A | * | 10/1943 | Wine | 303/54 |
| 2,335,372 | A | * | 11/1943 | Wine | 305/4 |
| 3,221,830 | A | * | 12/1965 | Walsh | 180/180 |
| 5,380,075 | A | * | 1/1995 | Haws | 305/5 |
| 5,451,001 | A | * | 9/1995 | Kumm | 239/726 |
| 5,842,756 | A | | 12/1998 | Haws | |

* cited by examiner

*Primary Examiner*—Russell D Stormer
(74) *Attorney, Agent, or Firm*—Dennis L. Thomte; Thomte Patent Law Office LLC

(57) ABSTRACT

A flotation drive wheel is provided for a self-propelled irrigation system such as a center pivot irrigation system, a linear irrigation system or a corner irrigation system. The flotation drive wheel of this invention comprises a hub portion which is directly attached to an associated gearbox of the conventional drive tower. A metal band or plate is welded to the outer periphery of the hub portion of the wheel with a plurality of pivotal flotation shoes being attached to the band or plate. The pivotal shoes include structure for preventing soil from being pushed laterally of the flotation wheel and from being pushed forwardly from the drive wheel. The flotation wheel of this invention substantially eliminates the creation of wheel ruts or tracks.

14 Claims, 6 Drawing Sheets

FLOTATION DRIVE WHEEL FOR A SELF-PROPELLED IRRIGATION SYSTEM

CROSS REFERENCE TO RELATED APPLICATION

This application claims the benefit of the provisional application entitled FLOTATION DRIVE WHEEL FOR A SELF-PROPELLED IRRIGATION SYSTEM, Ser. No. 60/905,645, Filed Mar. 8, 2007.

BACKGROUND OF THE INVENTION

1. Field of the Invention

This invention relates to a flotation drive wheel for a self-propelled irrigation system such as a center pivot irrigation system, a linear irrigation system or a corner irrigation system. More particularly, this invention relates to a flotation drive wheel for a self-propelled irrigation system which reduces the wheel ruts or tracks normally created by the drive wheels of the irrigation system.

2. Description of the Related Art

Self-propelled irrigation systems such as a center pivot irrigation system, a linear irrigation system or a corner irrigation system utilize drive towers which not only support the main water supply pipe above the ground, but which also drive the irrigation system over the field to be irrigated. Normally, each of the drive towers has a pair of spaced-apart drive wheels which are driven by any convenient means such as an electric motor which is connected to a gearbox at each end of the main beam of the drive tower.

As the self-propelled irrigation system moves through a field, whether the system is a center pivot irrigation system, a linear irrigation system or a corner irrigation system, the drive wheels on the support towers create wheel tracks or ruts in the field. In addition to creating wheel tracks or ruts which extend downwardly into the ground, the conventional drive wheels of the support towers cause soil to be displaced to either side of the wheel track. When the field is being prepared for seeding or the like, the wheel tracks subject the farm machinery to undue stress. Further, in minimum tillage or no-till fields, the wheel tracks tend to become deeper with each passing season, since the field is not cultivated or disked.

SUMMARY OF THE INVENTION

A flotation drive wheel for a self-propelled irrigation system is disclosed with the flotation drive wheel including a metal hub portion which is bolted directly to the gearbox of the associated drive tower. A ring-shaped flat band or plate is welded to the outer end or periphery of the hub portion of the floatation drive wheel so as to extend laterally from both sides of the periphery of the hub portion of the wheel.

A plurality of radially-spaced shoes are pivotally secured intermediate their lengths to the ring-shaped band about a horizontal axis which is parallel to the axis of rotation of the drive wheel. Each of the shoes has a flat base portion with side portions extending upwardly and outwardly therefrom. An inverted V-shaped angle member is welded to the outer surface of the base plate at the leading edge thereof, at the trailing edge thereof, and intermediate the length thereof.

The pivotal connection of the shoes to the ring-shaped band permits the shoes to pivot with respect to the wheel as the drive wheel is being rotated by the gearbox. The pivotal connection between the shoes and the ring-shaped band enables the shoes to be substantially horizontally disposed when moved into ground engagement as the drive wheel is being rotated.

The shape of the shoes and the pivotal connection thereof create sufficient flotation to the drive wheel so as to reduce the amount of wheel tracks or ruts from being created. The design of the shoes reduces the amount of soil which is normally pushed forwardly of the drive wheel as the drive wheel is rotated and also reduces the amount of soil normally displaced to either side of the drive wheel during rotation of the drive wheel.

It is therefore a principal object of the invention to provide an improved flotation drive wheel for a self-propelled irrigation system.

Yet another object of the invention is to provide a flotation drive wheel for a self-propelled irrigation system which is of steel construction thereby eliminating the flat tire problems associated with conventional pneumatic drive wheels.

Still another object of the invention is to provide a flotation drive wheel for a self-propelled irrigation system which substantially reduces the formation of wheel tracks or ruts.

Still another object of the invention is to provide a flotation drive wheel for a self-propelled irrigation system which includes a plurality of floating shoes pivotally mounted to the outer periphery of the drive wheel hub portion and which prevent soil from being pushed forwardly of the rotating drive wheel and which prevents or reduces soil being pushed laterally from the drive wheel as the drive wheel is rotated.

A further object of the invention is to provide a flotation drive wheel for a self-propelled system of the type described including means for preventing dirt and mud from sticking to the shoes.

These and other objects will be apparent to those skilled in the art.

DETAILED DESCRIPTION OF THE INVENTION

Figure 1:
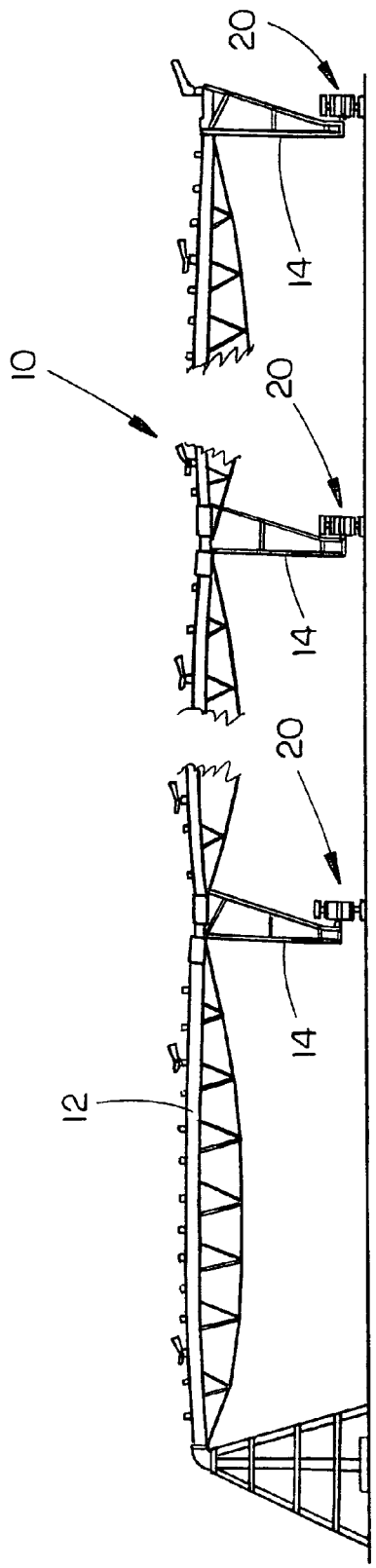
FIG. 1 is a partial side view of a self-propelled irrigation system.
Figure 2:
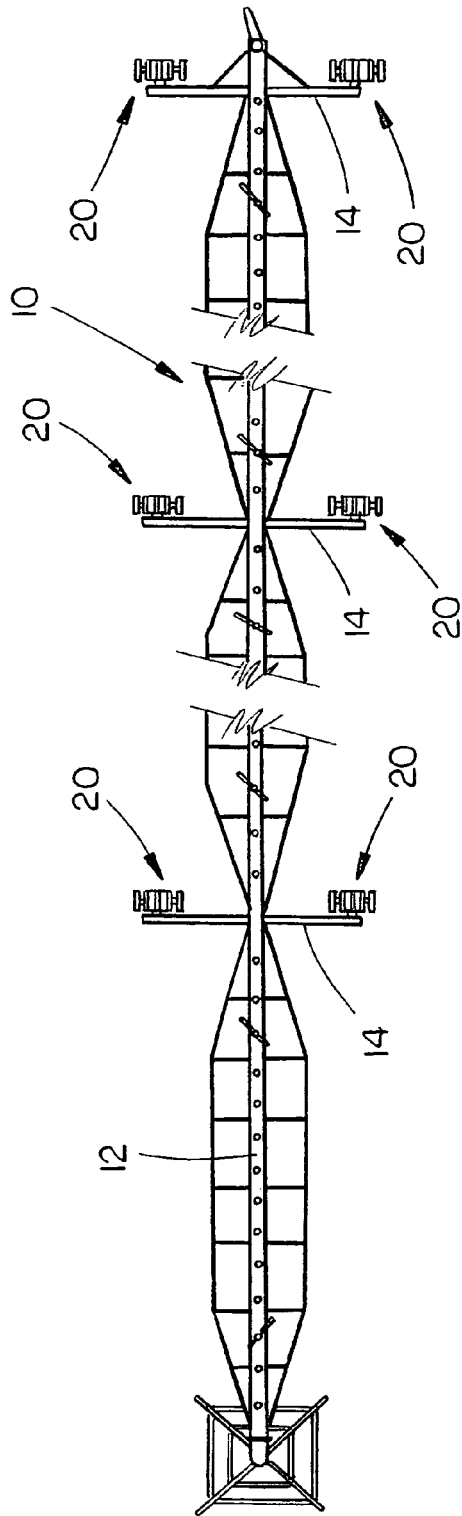
FIG. 2 is a top view of the irrigation system.
Figure 3:
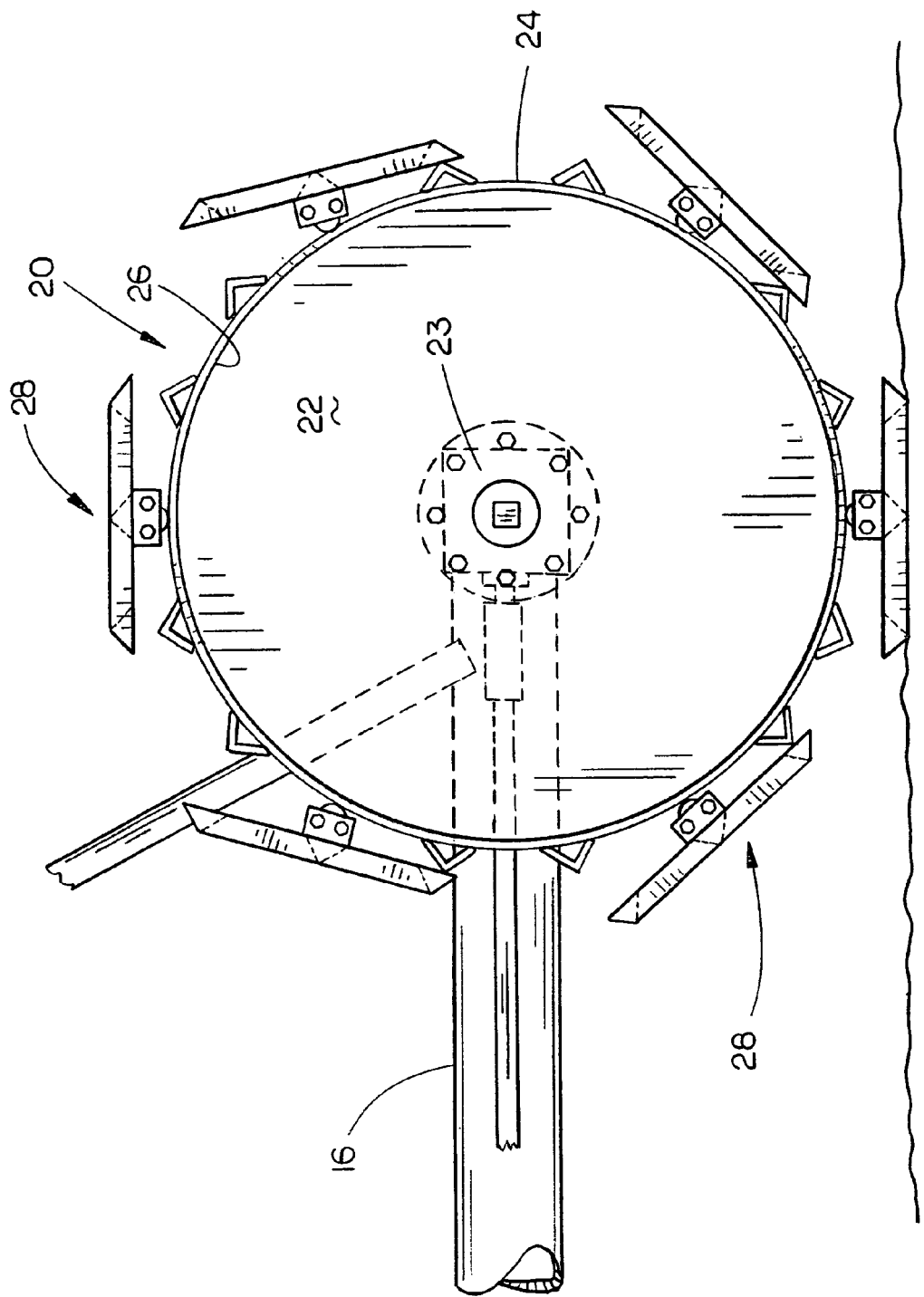
FIG. 3 is a side elevational view of the flotation drive wheel of this invention mounted on one end of the main beam of a drive tower of the irrigation system.
Figure 4:
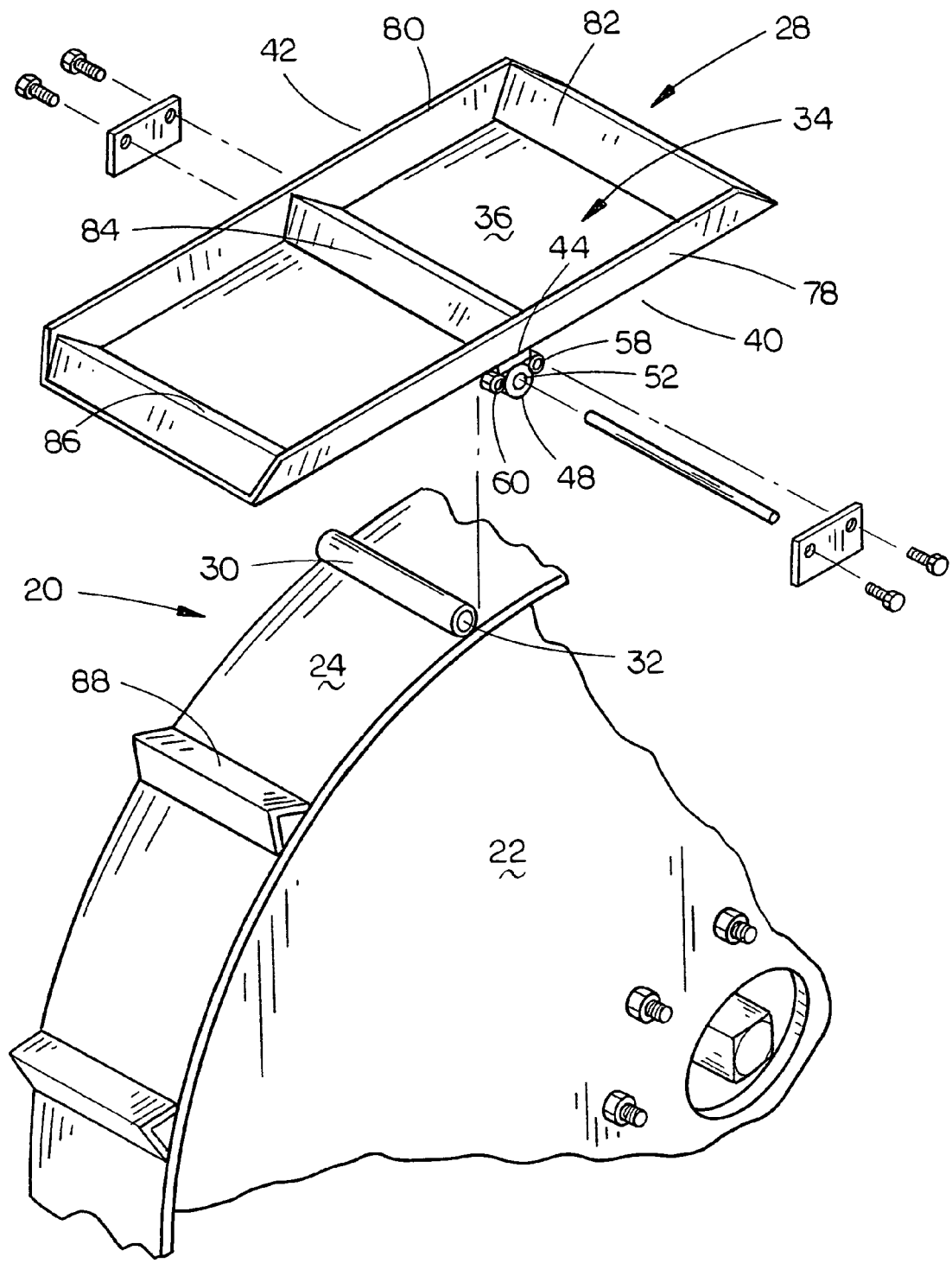
FIG. 4 is a partial perspective view illustrating the manner in which one of the shoes is pivotally secured to the flotation drive wheel.

In the drawings, the numeral 10 refers to a typical center pivot irrigation system including a main water supply line 12 supported by a plurality of drive towers 14. Although a center pivot irrigation system is depicted, the irrigation system is a self-propelled irrigation system which could be a center pivot irrigation system, a linear move irrigation system or a corner irrigation system. Regardless of the type of irrigation system, the water supply pipe 12 is supported upon the drive towers 14 with each of the drive towers 14 having a pair of drive wheels mounted on the main beam 16 of the tower for propelling the tower and the water supply pipe 12 over the field to be irrigated.

Figure 5:
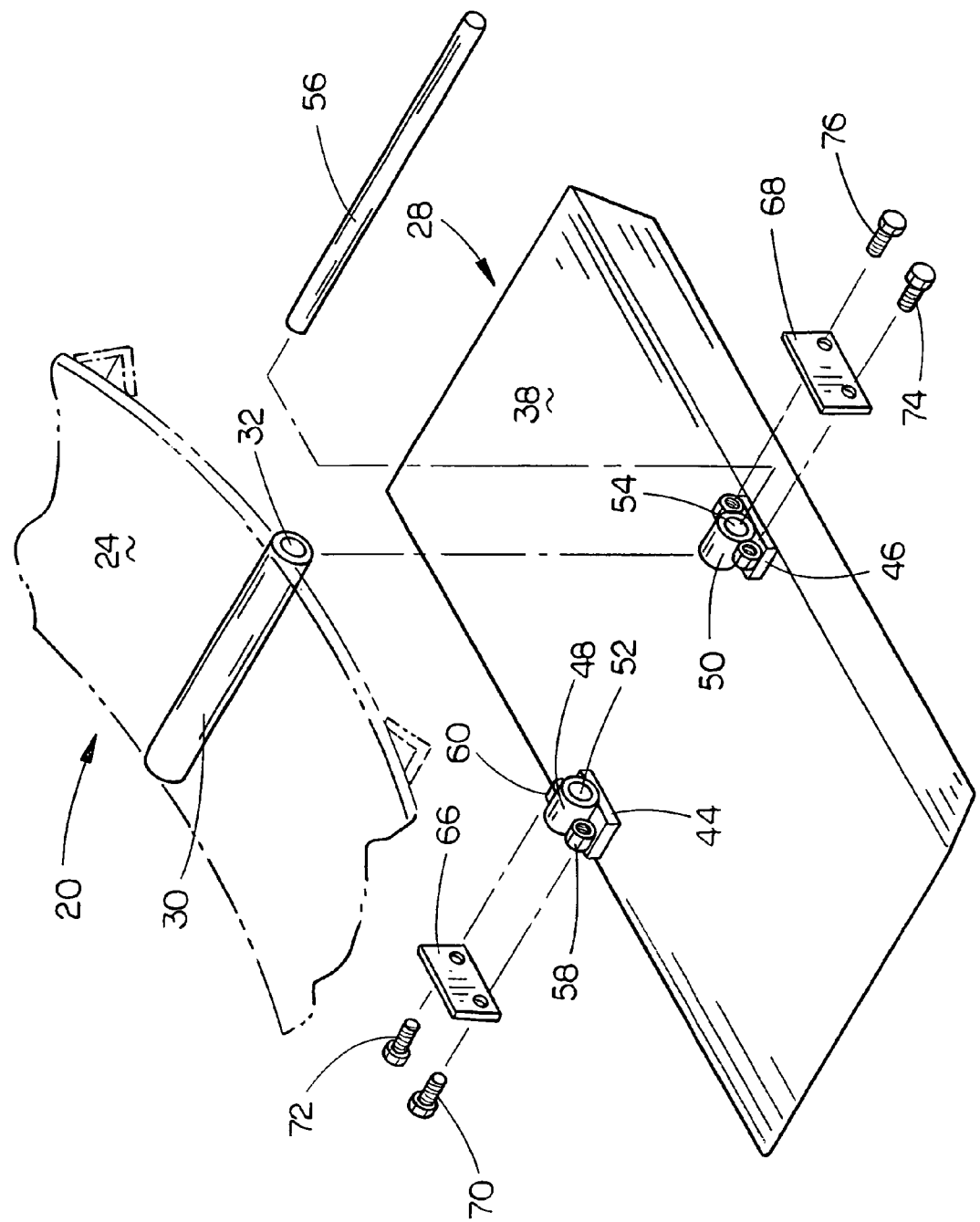
FIG. 5 is a partial perspective view illustrating the manner in which the flotation shoe is secured to the flotation drive wheel.
Figure 6:
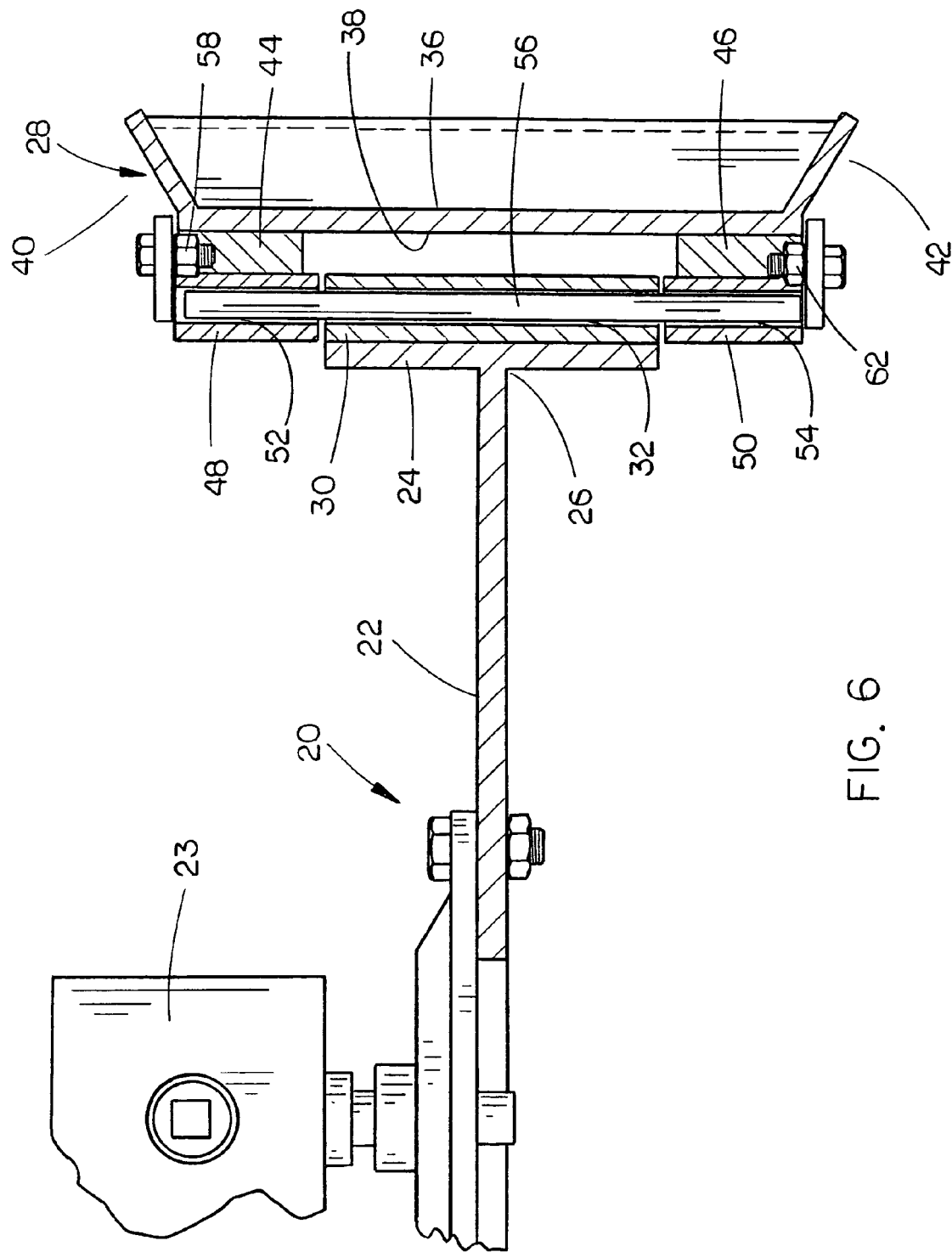
FIG. 6 is a partial sectional view illustrating the invention.

The conventional drive wheels of self-propelled irrigation systems create wheel ruts or tracks and it is for that reason that applicant has provided a unique flotation drive wheel 20 which is substituted for each of the drive wheels 16 and 18 to substantially reduce the wheel tracks or ruts which would normally be created by the drive wheels on each of the towers 14. The flotation drive wheel 20 of this invention includes a hub portion 22 which is directly bolted to the conventional gearbox 23 which is provided for each of the drive wheels. Preferably, the hub portion 22 is constructed of a metal material. A ring-shaped band or plate 24 is welded to the periphery 26 of the hub portion 22 and is preferable five inches wide. A plurality of pivotal shoes 28 are pivotally secured to the band or plate 24 about a horizontal axis which is parallel to the axis of rotation of the drive wheel so as to extend around the periphery thereof. Inasmuch as each of the shoes 28 are identical, only a single shoe 28 will be described. A five inch long tube or pipe 30 is welded to the exterior surface of ring or band 24 and has a one inch diameter bore or opening 32 extending therethrough. Shoe 28 includes a metal plate 34 or base portion having an outer surface 36 and an inner surface 38. For purposes of description, plate 34 will be described as including opposite sides 40 and 42. A pair of spaced-apart metal plates 44 and 46 are welded to the inner surface of plate 34 at the sides 40 and 42 thereof, as illustrated in FIG. 5 by welding or the like. Preferably, each of the plates 44 and 46 has a width of 2¼ inches.

Tubes or pipes 48 and 50 are welded to the plates 44 and 46, respectively, and also have one inch bores or openings 52 and 54 formed therein, respectively. The numeral 56 refers to an elongated pivot pin which is preferably 9¼ inches long which extends through the opening 52 in pipe 48, through the opening 32 in pipe 30 and through the opening 54 in pipe 50 to pivotally connect the shoe 28 to the band 24. A pair of nuts 58 and 60 are welded to the outer sides of pipe 48 and a pair of nuts 62 and 64 are welded to the outer sides of pipe 50. The numerals 66 and 68 refer to plates which are positioned at the outer ends of pipes 48 and 50, respectively, to maintain the pin 56 in the pipes 48, 30 and 50. Each of the plates 66 and 68 has a pair of openings formed therein adapted to receive bolts 70, 72 and 74, 76 extending therethrough which are threadably secured to the nuts 58, 60 and 62, 64, respectively, to maintain the plates 66 and 68 in position at the outer ends of the pivot pin 56.

Preferably, the plate 34 of the shoe 28 has upwardly and outwardly extending side portions 78 and 80 which extend between the ends thereof. Preferably, side portions 78 and 80 are disposed at approximately a 45-degree-angle with respect thereto. Preferably, inverted V-shaped angle members 82, 84 and 86 are welded to the outer surface 36 of plate 34 at the leading edge, center length and trailing edge thereof. Preferably, the outer surface of band or plate 24 is provided with a plurality of spaced-apart inverted V-shaped angle members 88 which are positioned thereon so as to limit the pivotal movement of the shoe 28 with respect to the band or plate 24.

Preferably, the shoes 28 and the components thereof such as the plate 34, side portions 78 and 80, angle members 82, 84 and 86 are coated with a non-stick surface or coating such as Teflon®, etc. to prevent mud or dirt from sticking to the shoe to aid in preventing wheel ruts. The shoe 28 itself could be constructed of a non-stick material if so desired.

Figure 7:
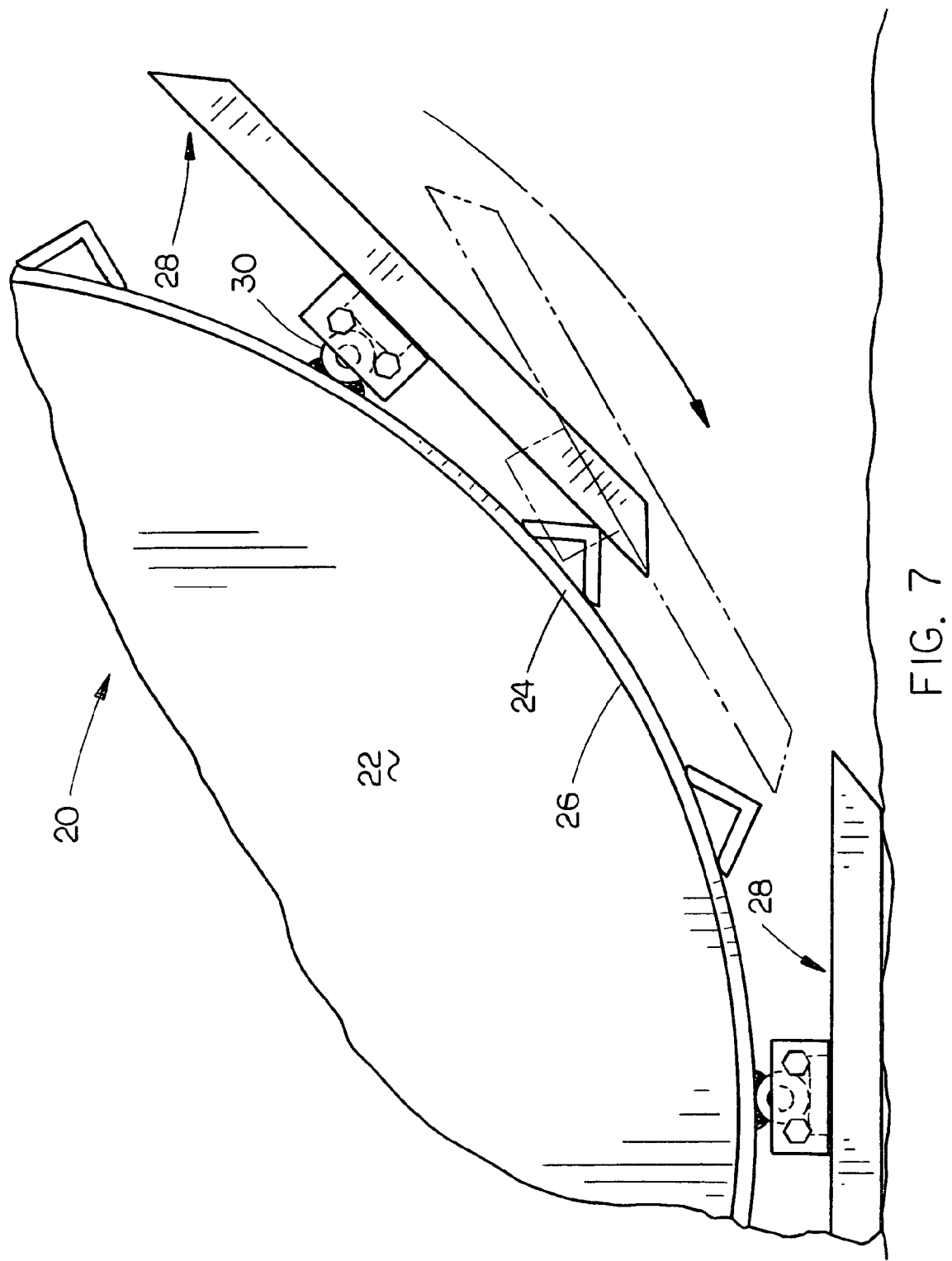
FIG. 7 is a partial side view of the flotation drive wheel of this invention illustrating the manner in which the flotation shoe comes into contact with the ground.

In use, the drive wheels of the conventional self-propelled irrigation system will be replaced with a pair of the flotation drive wheels 20. The hub portion 22 of the flotation drive wheel 20 is directly bolted to the associated gearbox 23. As the gearbox rotates the flotation drive wheel 20, the shoes 28 will be sequentially brought into engagement with the ground surface. The pivotally connection of the shoes 28 to the ring-shaped band 24 causes the shoes 28 to be substantially horizontally disposed as they come into ground contact, as seen in FIG. 7. The sides 78 and 80 on the shoe 28 aid in limiting the amount of soil which may be otherwise pushed laterally from the wheel. Similarly, the angle members 82 and 86 tend to trap the soil therebetween as the shoe 28 moves into contact with the soil, thereby preventing the soil from being pushed forwardly of the drive wheel 20, regardless of the direction of rotation of the drive wheel.

The wide and long design of the plates 34 of the shoes 28 provides needed flotation of the drive wheel so that ruts or wheel tracks are not created. It can also be seen that the metal construction of the flotation drive wheel 20 eliminates the flat tire problems normally associated with conventional drive wheels on drive towers.

Thus it can be seen that the invention accomplishes at least all of its stated objectives.

The invention claimed is:

1. A flotation drive wheel for a self-propelled irrigation system, comprising:
    a circular hub portion having opposite sides and an outer peripheral portion;
    a ring-shaped band having inner and outer surfaces, secured to said outer peripheral portion so as to extend laterally from both sides thereof;
    a plurality of generally rectangular shoes;
    each of said shoes having a flat base portion with inner and outer surfaces, first and second ends, and first and second sides;
    each of said shoes being pivotally secured intermediate its length to said band about a horizontal axis which is parallel to the axis of rotation of the drive wheel;
    said shoes being secured to said band in a radially-spaced manner;
    each of said shoes having a first inverted V-shaped angle member secured to said outer surface of said base portion at said first end thereof which extends between said first and second sides of said base portion;
    each of said shoes having a second inverted V-shaped angle member secured to said outer surface of said base portion at said second end thereof which extends between said first and second sides of said base portion;
    each of said shoes having a third inverted V-shaped angle member secured to said outer surface of said base portion between said first and second angle members;
    said third inverted V-shaped angle member extending between said first and second sides of said base portion.

2. The flotation drive wheel of claim 1 wherein each of said shoes has a first and second side portions secured to said outer surface of said base portion at said first and second sides thereof which extend therefrom.

3. The flotation drive wheel of claim 2 wherein said outer surface of said base portion of said shoes, said angle members and said side portions have a non-stick surface provided thereon.

4. The flotation drive wheel of claim 1 wherein said band has a plurality of transversely extending V-shaped members secured to said outer surface thereof in a radially-spaced apart manner which are positioned between the ends of said shoes and said band and which have a width substantially equal to the width of said band.

5. The flotation drive wheel of claim 4 wherein said V-shaped members which are secured to said band are positioned thereon so as to be positioned between said ends of said base portions and said band so as to limit the pivotal movement of said shoes with respect to said band.

6. The flotation drive wheel of claim 1 wherein said base portions of said shoes have a width greater than the width of said band.

7. The flotation drive wheel of claim 1 wherein said outer surface of said band has a plurality of radially spaced-apart tubes having opposite ends, secured thereto in a transversely extending manner and wherein each of said base portions of said shoes have an elongated pivot pin associated therewith which is pivotally received by one of the tubes secured to said band, said tubes having a length substantially equal to the width of said band.

8. The flotation drive wheel of claim 7 wherein said pivot pin associated with each of said shoes has its ends received by a pair of spaced-apart sleeves secured to said shoe.

9. The flotation drive wheel if claim 8 wherein retainers are secured to each of said sleeves to maintain said pivot pin in said sleeves.

10. The flotation drive wheel of claim 1 wherein said outer surface of said base portion of said shoes have a non-stick surface provided thereon.

11. The flotation drive wheel of claim 10 wherein said angle members also have a non-stick surface provided thereon.

12. The flotation drive wheel of claim 1 wherein each of said portions have a substantially constant width between said first and second ends of said base portion to limit the amount of soil which would otherwise be pushed laterally of the wheels.

13. The flotation drive wheel of claim 12 wherein said side portions extend outwardly and laterally from said base portion.

14. The flotation drive wheel of claim 13 wherein said side portions extend from said base portion at approximately a 45-degree angle.

* * * * *